Figure 1:
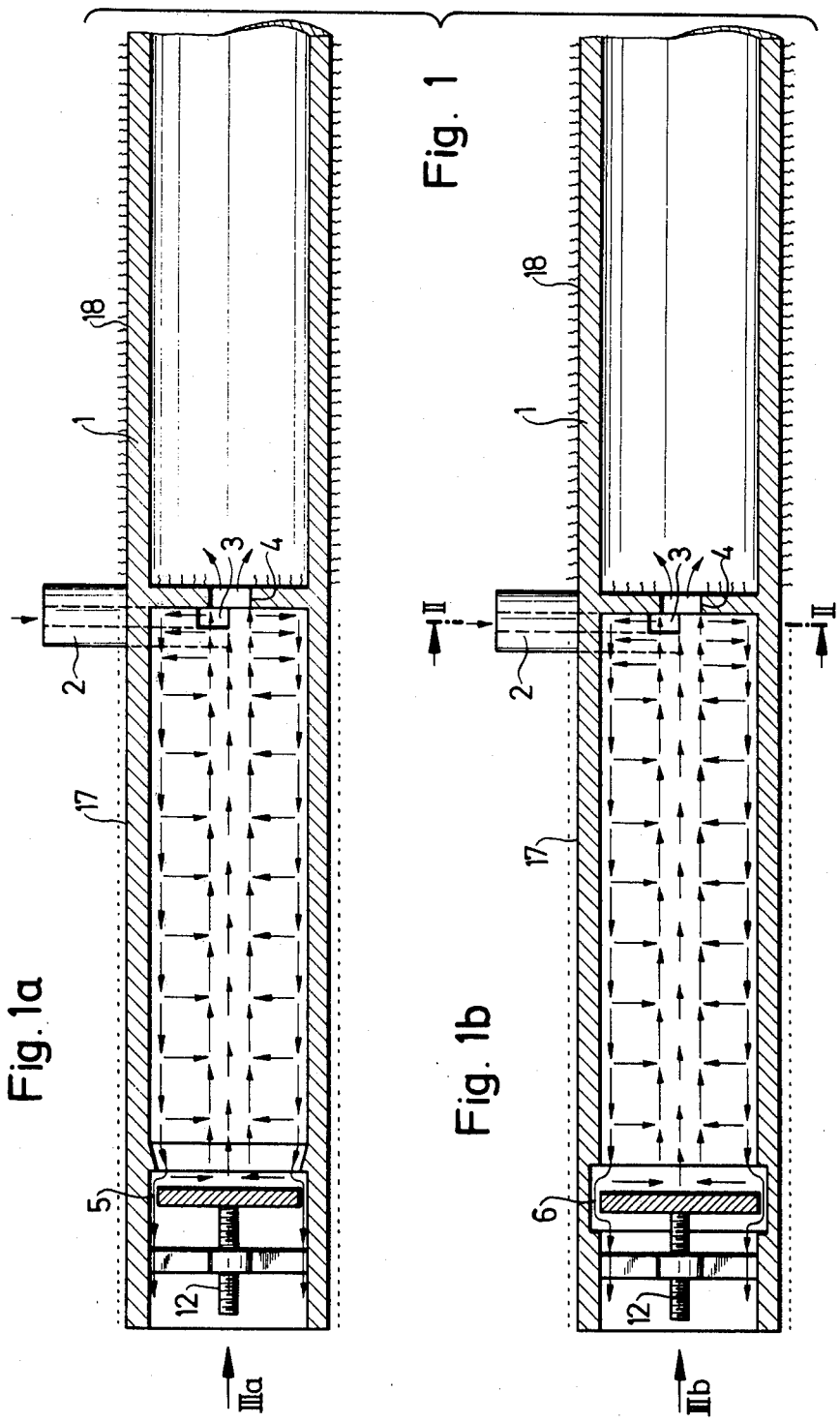

United States Patent [19]
Hejlek

[11] 3,990,634
[45] Nov. 9, 1976

[54] METHOD AND APPARATUS FOR THE CONTINUOUS MULTIPLIED ENRICHMENT OF GASEOUS ISOTOPES OF HEAVY ELEMENTS

[76] Inventor: Franz Hejlek, Treustrasse 92/6/13, Vienna 20, Austria

[22] Filed: Dec. 6, 1973

[21] Appl. No.: 422,601

[30] Foreign Application Priority Data
Dec. 6, 1972    Austria .............................. 10396/72

[52] U.S. Cl. ............................. 233/27; 233/47 R;
233/DIG. 1; 55/17; 55/459 R; 209/144
[51] Int. Cl.² ......................................... B04B 11/00
[58] Field of Search ....................... 55/17, 392, 459;
209/144, 211; 233/1 R, 1 A, DIG. 1, 11, 27, 47 R

[56] References Cited
UNITED STATES PATENTS

| | | | |
|---|---|---|---|
| 1,123,867 | 1/1915 | Gue | 55/17 |
| 2,846,024 | 8/1958 | Bremi | 55/454 |
| 3,019,780 | 2/1962 | Nuding | 55/410 |
| 3,129,075 | 4/1964 | Anliot | 55/17 |
| 3,273,325 | 9/1966 | Gerhold | 55/17 |
| 3,426,513 | 2/1969 | Bauer | 55/459 |
| 3,460,318 | 8/1969 | Creutz | 55/17 |
| 3,648,840 | 3/1972 | Bobo | 209/211 |
| 3,747,306 | 7/1973 | Wikdahl | 55/17 |

*Primary Examiner*—Bernard Nozick
*Attorney, Agent, or Firm*—Toren, McGeady and Stanger

[57] ABSTRACT

A method and apparatus for the continuous multiplied enrichment of gaseous isotopes of heavy elements by means of gravity-and expanding pressure fields and gas circulation is disclosed. The method is carried out in a pipe or tube with a smooth inner surface and having an inlet and first and second discharge means. One or several nozzles are arranged adjacent the inlet and extend in a plane perpendicular to the pipe axis so as to discharge tangentially relative to the inside pipe circumference. The first discharge means is formed by annular slots situated at the inner circumference of the pipe or it is formed in the region of the pipe axis. In an alternative embodiment of the pipe, the first discharge means is in the form of openings extending tangentially from the inner pipe circumference. The second discharge means is spaced from the first discharge means and is in the form of an annular aperture adjacent the pipe axis and in the vicinity of the inlet. According to the inventive method and apparatus, a gaseous isotope mixture to be separated is forced under pressure through the nozzles and thus into the pipe, whereby a rotary flow of the gaseous mixture builds up within said pipe which is propelled by subsequently incoming amounts of gas mixture. The rotary flow extends to the first discharge means and also generates a suction force within the pipe adjacent the inlet. The gas mixture, due to the rotary flow, is divided into a first portion enriched with heavy isotopes due to the occurring centrifugal forces and a second portion containing lighter isotopes. The first portion exits at least partially through the first discharge means of the pipe while the second portion flows in opposite direction towards the second discharge means, whereby the second portion, at least partially, is sucked in by the suction force and thus is caused repeatedly to circulate, thereby increasing the enrichment effect.

9 Claims, 16 Drawing Figures

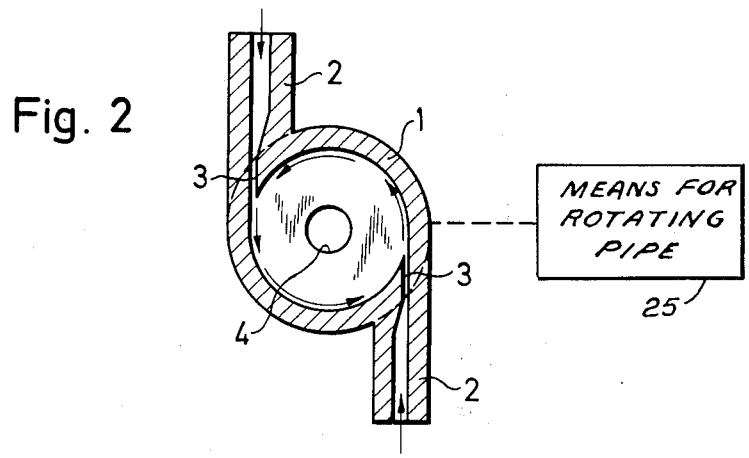
Fig. 2
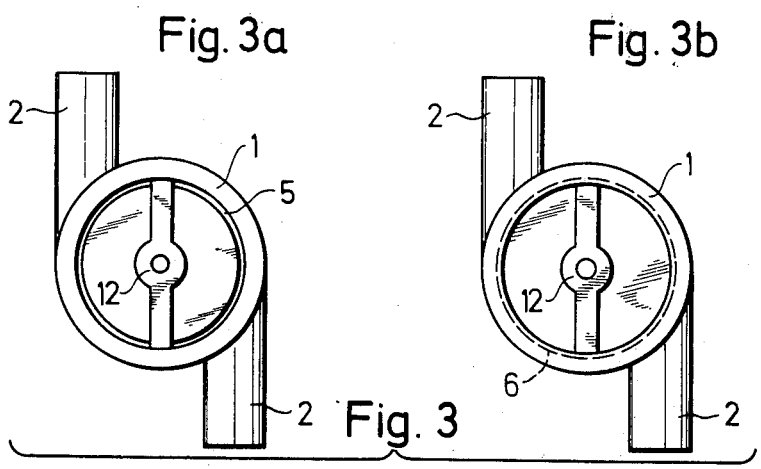
Fig. 3a   Fig. 3b
Fig. 3
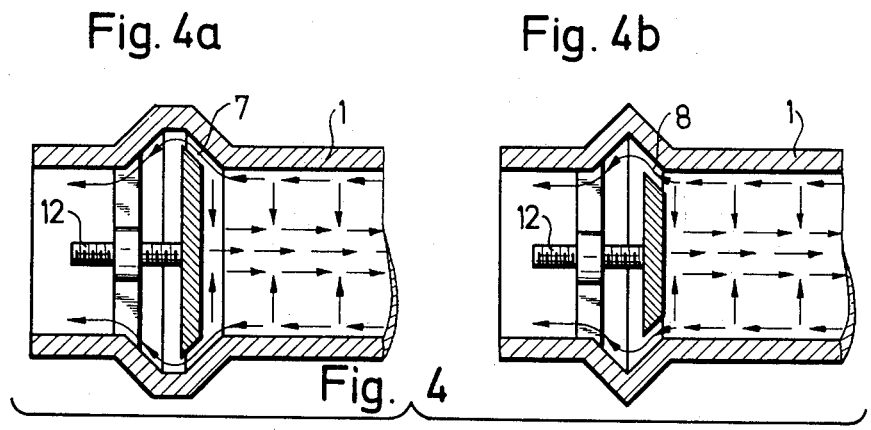
Fig. 4a   Fig. 4b
Fig. 4

METHOD AND APPARATUS FOR THE CONTINUOUS MULTIPLIED ENRICHMENT OF GASEOUS ISOTOPES OF HEAVY ELEMENTS

FIELD OF INVENTION

The invention relates to a process for the multiplied continuous enrichment of gaseous isotopes of heavy elements, in particular uranium hexafluoride, by means of gravity- and expanding pressure fields, as well as gas circulation.

BACKGROUND INFORMATION AND PRIOR ART

Due to their low elementary separation effect, the known processes for the separation of gaseous heavy isotopes, such as the gas diffusion process, require several thousand stages which are combined into a cascade, so as to achieve the desired enrichment. The sensitive membranes as well as the enormous energy requirement to achieve a large mass throughput, constitute a significant obstacle to large scale industrial plants.

With known gas centrifuges, the improved separation effect is dependent on the absolute mass difference $\Delta M$ of the isotopes and not on the relative mass difference $\Delta M/M$ or its root, as is the case with the other processes. By adding a light booster or auxiliary gas and by heating the outer walls bottoms of the centrifuge, it has been attempted to attenuate occurring turbulences and to achieve multiplication of the primary radial separator phase or stage. However, not all instances yielded reproducible results. Further, the results were far below the theoretical value. The low throughput of material as well as the considerable equipment expenditure for those components of the centrifuge which are subject to high mechanical stresses, constitute significant drawbacks of this prior art procedure.

The known separator nozzle process is based on the partial spatial separation or de-mixing of isotopes of different weights in an expanding supersonic jet, whose flow areas are bent or emanate from a bent Laval nozzle. As in a centrifuge, the heavier component becomes enriched or concentrated in the vicinity of the deflector wall and can there be branched off away from the gas current or flow by a detaching or separating element, such as a sharp blade having a knife edge. Attempts have also been made to perform an improved isotope separation by means of a light auxiliary gas. This procedure, however, again requires increased energy consumption. The effectiveness or efficiency of the separator nozzle procedure corresponds substantially to that of the diffusion process.

SUMMARY OF THE INVENTION

The primary object of the present invention is to provide a procedure which overcomes or at least minimizes the drawbacks of the known procedures and which yields a multiplication of the primary separation effect and permits a significantly greater mass throughput while using a simple apparatus requiring a minimum of expenditure.

Generally, it is an object of the invention to improve on isotope enrichment procedures as presently practiced.

Briefly and in accordance with the invention, the above objects are achieved by carrying out the procedure in a device which comprises a pipe or tube whose interior is as smooth as possible. Adjacent one of its ends, the pipe is provided at its circumference with one or several nozzles which extend perpendicular to the pipe axis. The discharge openings of the nozzles open up tangentially to the pipe periphery. The gaseous isotope mixture to be separated flows through these nozzles and thus into the pipe interior. The gaseous isotope mixture may be admixed with a light auxiliary or booster gas. A dragging or constricted entry of the gas flow into the pipe interior is particularly desired. The gas mixture is forced through the nozzles and thus into the pipe space under pressure and the tangential entry of the gas causes a rotary flow within the pipe space of great peripheral speed. This rotary flow, in somewhat reduced manner, extends up to the other end of the pipe. Due to this rotary flow, a centrifugal field occurs which, along the entire pipe length causes the first enrichment effect for the heavier isotopes. The pipe end is provided with a first discharge means which in one embodiment is a narrow slot at the inner circumference of the pipe. In another embodiment, the first discharge means is in the form of a relatively small enlargement which extends across the circumference, or blade-like slots may be provided. This first discharge means thus causes discharge of the marginal layers of the isotope mixture which, due to the rotary movement, has been enriched with heavy isotopes. Instead of providing the first discharge means at the pipe circumference, it is also feasible to arrange it in the pipe axis in the form of an annular aperture. Substantially the same effect is obtained in this manner. Since substantially the same speeds as in a centrifuge are obtained, the rotary or screw-like flow causes a centrifugal field which is constantly replenished by the continuous inflow of isotope mixture. Contrary to the single deflection as it takes place in the separator nozzle process, the individual molecules of the gas mixture subjected to the inventive procedure are whirled or spun around many thousands of times more in the centrifugal field, thereby considerably increasing the primary separation effect.

A second multiplication of the separation effect is achieved by the fact that the centrifugal field and over the entire pipe length simultaneously builds up a pressure field which releases itself towards the pipe axis, a phenomenon which in turn is attended by an increase in speed. Due to the maintenance of the rotary impulse, the particles experience a marked increase in their rotary speed at a small radius. This results in an increase of the centrifugal acceleration. As a result thereof, heavy isotopes are thus forced outwardly towards the pipe wall. Considerable friction forces occur in this manner which attempt to bring about a rotary movement of the entire gas mass with constant angular velocity. The energy is given off to the pipe wall in the form of heat. If the mass throughput is large, the pipe wall is cooled since oftentime a decomposition of the isotope gas may occur. Given the attainable and permissible temperature differences, the heat diffusion is with heavy isotopes practically zero and thus it can be neglected.

The relaxed or released gas molecules which are enriched with light isotopes collect in the pipe axis and are discharged through an annular aperture which is situated adjacent the inflow nozzles. This annular aperture permits gas exit in the proximity of the axis only. By properly choosing the aperture width and the width of the slots, any desired mixing ratio for the enriched discharging components of the lighter and heavier gaseous isotopes can be achieved. The annular aperture and the pipe piece adjacent thereto are cooled by the refluxed gas. If a larger throughput is used, it is thus necessary to heat these elements in order to avoid condensation of gas components.

The inventive procedure can be carried out under any suitable pressure of several atmospheres down to a slight excess pressure of a few mm/Hg. If the pressure is low, the two discharges should be connected to a pumping system.

In addition to the two multiplication effects described above, a third effect takes place. This third multiplication effect is due to the fact that in the vicinity of the nozzles where the rotary flow and the pressure field are building up, a suction effect is created by the incipient rotary flow. Due to this suction effect a portion of the isotope mixture which contains the lighter isotopes, to wit, the gas which flows along the pipe axis and is more relaxed, is once again drawn into the two above described multiplication processes. This suction in the vicinity of the nozzles acts from the pipe axis towards the pipe wall and is the cause of the axial flow of the relaxed gases towards the cold annular aperture in the center of the axis. This suction thus causes a multiple circulation of gas particles in the rotary field, which in turn causes a multiplication of the separation effect. In the absence of this suction in the vicinity of the nozzles, axial flow of the relaxed gases in opposite direction in the proximity of the axis could take place. The measurable pressure drop or gradient is therefore oriented at the pipe wall from the inflow nozzles towards the first discharge means at the circumference at the warm portion of the pipe wall, while the pressure drop in the axis is oriented in opposite direction towards the cold annular aperture in the axis. As the result of this course of the pressure gradient and the resultant circulation, it is therefore also possible on the warm side of the pipe to discharge gas enriched with heavy isotopes from the center of the pipe axis instead from the circumference of the pipe without any substantial loss of heavy gas isotopes. The width of this annular aperture on the warm side should be selected in such a manner that the pressure gradient in the cylinder axis — towards the cold annular aperture — is preserved. The length of the pipe should be dimensioned such that an adequate rotary flow still exists at the warm discharge or outflow end.

The inventive procedure is particularly stable and reproducible. A similar arrangement was designed by Ranque, Hilsch and many others for obtaining low temperatures for cooling purposes. By contrast, the inventive procedure makes use of the rotary flow for the purpose of isotope separation. An an essential difference it should also be mentioned, that those areas which otherwise in the prior art procedures are provided for producing cold conditions, are heated in the inventive procedure while the warm areas have to be cooled. Further, in the prior art devices and in order to obtain adequate refrigeration, it is necessary to operate at high excess pressures so as to achieve effects which can be materialized in economical manner since the efficiency for cooling purposes is extremely low.

It is known that in a centrifuge the separation capacity increases with the fourth power of the peripheral speed. It follows that if the inventive procedure is carried out in a rotated pipe, the pipe acts as a centrifuge and an additional increase of the separation capacity to the indicated extent takes place. For this purpose and for symmetry reasons, an even number of inflow nozzles of the kind previously described, is arranged at one end in the direction of rotation of the centrifuge pipe. The outflow speed or the rotary flow speed of the gas jet is added to the rotary speed of the centrifuge (or in addition to the centrifugal forces there also occur Coriolis forces). As already stated above, the light, cool components may then also in this case be continuously discharged in the vicinity of the axis near the nozzles by means of an annular aperture arranged in this region while the heavy, warm isotope components are discharged continuously at the other end at the circumference or in the center of the axis.

It will be appreciated that by means of the inventive process, it is thus possible to achieve a continuous throughput with a centrifuge, which throughput with regard to quantity and multiplication of the separation effect as well as reproducibility is unattainable by any other procedure. It will be appreciated that with such continuous operation, the wall of the centrifuge which becomes heated during the operation, has to be cooled and the parts of the centrifuge which are cooled by the relaxed gas, have to be heated.

The pressure conditions of the incoming gas depend on the strength characteristics of the material of which the centrifuge is made and on the nature of the isotope mixture to be separated. As previously stated, these pressure conditions may vary within wide limits.

The inventive procedure satisfies all the requirements in respect of the largest possible separation effect, even considered from a theoretical viewpoint.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described the preferred embodiments of the invention.

FIGS. 1 –11 are different views of embodiments of apparatus to be used for carrying out the inventive procedure. These drawings indicate additional advantageous features and details of the invention.

FIG. 1 includes FIG. 1a and 1b illustrates a longitudinal sections through a pipe 1 which can successfully be used for carrying out the inventive procedure.

FIG. 2 is a cross-section through the pipe 1, the section taken in the region of the nozzles. In this embodiment, two nozzles 2 with dragging or constricted inlet 3 into the pipe 1 are used, the section being in direction towards the annular aperture 4 of the cold portion.

FIG. 2 also shows in schematic form element 25 which acts as means for rotating the pipe in a centrifugal manner about the longitudinal axis of the pipe. Rotational means for driving a tubular centrifuge are well known and include electric motors and hydraulic devices.

FIGS. 3a and 3b of FIG. 3 are views of possible constructions of the discharge means for the discharge of the warm portion of the gas mixture which is enriched with heavy isotopes. It will be noted that in one embodiment as shown in the upper half of FIG. 3, the discharge means is in the form of a narrow slot 5, while in another embodiment the discharge is accomplished by means of a slot-like recess 6 in the pipe wall as shown in the lower half of FIG. 3.

FIGS. 4a and 4b of FIG. 4 show sections of a discharge with obliquely directed slots 7 or 8.

Figure 5:
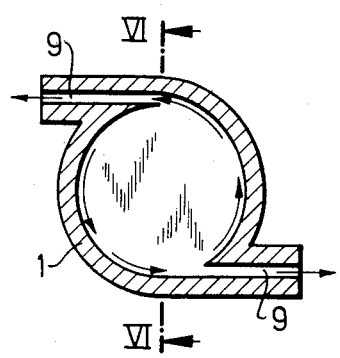
Figure 6:
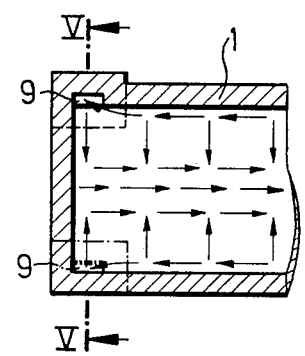

FIGS. 5 and 6 constitute a cross-section and a longitudinal section, respectively, of the pipe with two blade-like slots 9 for discharging the gas portion which is enriched with heavy isotopes. FIG. 5 is a cross-section taken along line VI — VI of FIG. 6. FIG. 6 is a longitudinal section taken along line V — V of FIG. 5.

Figure 7:
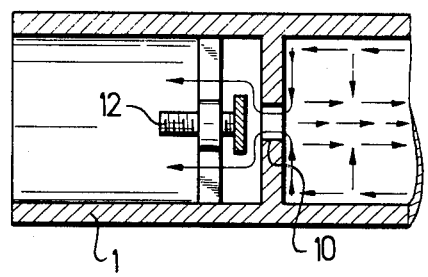
Figure 8:
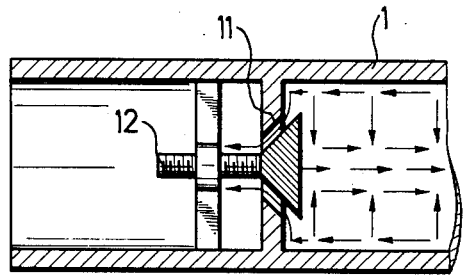

FIGS. 7 and 8 finally show the longitudinal section of the pipe with an annular aperture 10 or 11 arranged in the axis of the pipe for the discharge of the gas portion enriched with heavy isotopes.

The device indicated in FIGS. 1, 3, 4, 7 and 8 with reference numeral 12 serves the purpose to adjust the amount of isotope gas to be discharged from the pipe.

Figure 9:
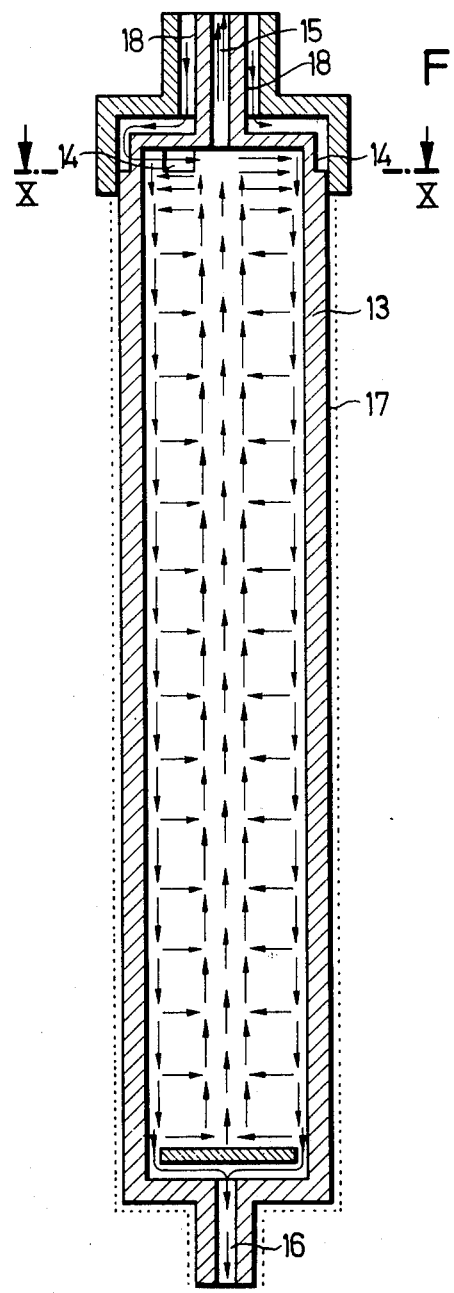

FIG. 9 shows a longitudinal section through a centrifuge 13 with two inflow nozzles 14 which are symmetrically arranged in the rotational direction of the centrifuge and through which the isotope mixture to be separated is forced into the centrifuge. At the area indicated by reference numeral 15, the cooled gas which is enriched with lighter isotopes is discharged while at the area indicated by reference numeral 16, the heated gas portion exits, to wit, the gas portion which is enriched with heavy isotopes.

Figure 10:
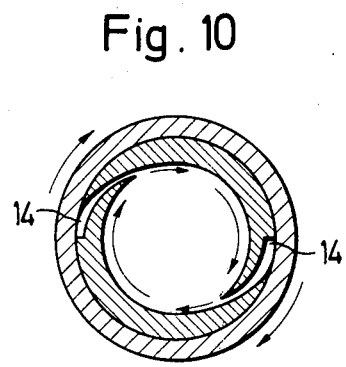

One embodiment for the inflow channel of the symmetrically arranged nozzles 14 is shown in FIG. 10. FIG. 10 is a crosssection taken along line X — X of FIG. 9.

Figure 11:
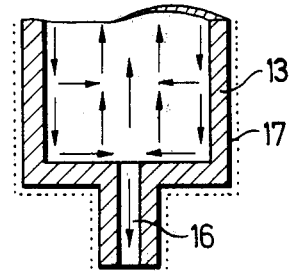

FIG. 11 shows a variation for the discharge of the heavy isotopes with an opening in the axis of the centrifuge. At the surfaces 17 in FIGS. 1 and 9, which have been indicated by dots in order to make them more clearly recognizable, it is necessary to provide a suitable cooling. By contrast at the surfaces indicated by reference numeral 18 and the short wave lines perpendicular to these surfaces, it is necessary to provide a suitable heating.

The arrows in the Figures indicate the flow direction of the isotope gas. From the flow direction as indicated by the arrows, it can be seen that at the nozzles 2 in FIG. 1 and 14 in FIG. 9, a partial flow takes place from the axis towards the wall of the pipe which is responsible for the circulation of one part of the isotope gas. By contrast, in the other regions, particularly at the end of the pipe at the discharge slots for the heavy isotope components, a flow towards the pipe axis takes place.

It is advantageous to introduce the isotope mixture at subsonic speed from the discharge openings of the nozzles into the interior of the pipe. The size of the slots 5 – 11 as shown in the drawings, should preferably be adjustable. These slots are initially closed until an approximately stationary condition of the isotope distribution has adjusted itself in the interior of the pipe. The slots are then opened.

By means of the inventive procedure, gravity fields in a magnitude of between 100 to 400.000 g can be obtained. In special cases even higher values can be achieved.

The inventive procedure makes it possible successfully to separate isotopes whose mass difference is very small.

What is claimed is:

1. A method for the continuous multiplied enrichment of gaseous isotopes of heavy elements by means of gravity- and expanding pressure fields and gas circulation, said method to be carried out in a pipe having an end wall with a smooth inner surface and having an inlet and first and second discharge means, at least one nozzle being arranged adjacent said inlet and extending in a plane perpendicular to the longitudinal axis of the pipe so as to discharge tangentially relative to the inside pipe circumference, said first discharge means being formed by an annular slot situated at the inner circumference of the pipe defined by an annular member and the inner circumference of the pipe, said second discharge means being spaced from said first discharge means and being in the form of an annular aperture in said end wall adjacent the pipe axis and in the proximity of said inlet and said nozzles, said method comprising:

rotating said pipe about the longitudinal axis of the pipe in the manner of a centrifuge, and forcing a gaseous isotope mixture to be separated under pressure through said nozzle in the direction of rotation of and into said pipe, a rotary flow of said gaseous mixture thereby building up within said pipe which is propelled by subsequently incoming amounts of gas mixture and which flow extends to said first discharge means, said rotary flow generating a suction force within said pipe adjacent said inlet, said gas mixture, due to said rotary flow, being divided into a first portion enriched with heavy istopes due to the occurring centrifugal forces, and a second portion containing lighter isotopes, said first portion enriched with heavy isotopes at least partially exiting through said first discharge means, while said second portion flows in opposite direction towards said second discharge means said second lighter isotope portion being at least partially sucked in by said suction force and thus caused repeatedly to circulate, thereby increasing the enrichment effect, said second lighter isotope portion primarily exiting through said annular aperture in said end wall of said second discharge means, the discharge flow speed of the gas being increased by the rotational speed of the pipe so that all enrichment effects, which increase by a factor corresponding to the fourth power of the rotational speed, are multiplied.

2. A method for the continuous multiplied enrichment of gaseous isotopes of heavy elements by means of gravity- and expanding pressure fields and gas circulation, said method being carried out in a pipe having an end wall with a smooth inner surface and having an inlet and first and second discharge means, at one nozzle being arranged adjacent said inlet and extending in a plane perpendicular to the longitudinal axis of the pipe so as to discharge tangentially relative to the inside pipe circumference, said first discharge means being formed by an annular slot situated in the region of the pipe axis with an annular baffle defining a flow passage thereabout, said second discharge means being spaced from said first discharge means and being in the form of an annular aperture in said end wall adjacent the pipe axis and in the proximity of said inlet and said nozzles, said method comprising:

rotating said pipe about the longitudinal axis of the pipe in the manner of a centrifuge, and forcing a gaseous isotope mixture to be separated under pressure through said nozzle in the direction of rotation of and into said pipe, a rotary flow of said gaseous mixture therefore building up within said pipe which is propelled by subsequently incoming amounts of gas mixture and which flow extends to said first discharge means, said rotary flow generating a suction force within said pipe adjacent said inlet, said gas mixture, due to said rotary flow, being divided into a first portion enriched with heavy isotopes due to the occurring centrifugal forces, and a second portion containing lighter isotopes, said first portion enriched with heavy isotopes at least partially exiting through said first discharge means, while said second portion flows in opposite direction towards said second discharge means, said second lighter isotope portion being at least partially sucked in by said suction force and thus caused repeatedly to circulate, thereby increasing the enrichment effect, said second lighter isotope portion primarily exiting through said annular aperture in said end wall of said second discharge means, the discharge flow speed of the gas being increased by the rotational speed of the pipe so that all enrichment effects, which increase by a factor corresponding to the fourth power of the rotational speed, are multiplied.

3. A method for the continuous multiplied enrichment of gaseous isotopes of heavy elements by means of gravity- and expanding pressure fields and gas circulation, said method being carried out in a pipe having an end wall with a smooth inner surface and having an inlet and first and second discharge means, at least one nozzle being arranged adjacent said inlet and extending in a plane perpendicular to the longitudinal axis of the pipe so as to discharge tangentially relative to the inside pipe circumference, said first discharge means being in the form of openings tangentially from the inner pipe circumference, said second means being spaced from said first discharge means and being in the form of an annular aperture in said end wall adjacent the pipe axis and in the proximity of said inlet and said nozzle, said method comprising:

rotating said pipe about the longitudinal axis of the pipe in the manner of a centrifuge, and forcing a gaseous isotope mixture to be separated under pressure through said nozzle in the direction of rotation of and into said pipe, a rotary flow of said gaseous mixture therefore building up within said pipe which is propelled by subsequently incoming amounts of gas mixture and which flow extends to said first discharge means, said rotary flow generating a suction force within said pipe adjacent said inlet, said gas mixture, due to said rotary flow, being divided into a first portion enriched with heavy isotopes due to the occurring centrifugal forces, and a second portion containing lighter isotopes, said first portion enriched with heavy isotopes at least partially exiting through said first discharge means, while said second portion flows in opposite direction towards said second discharge means said second lighter isotope portion being at least partially sucked in by said suction force and thus caused repeatedly to circulate, thereby increasing the enrichment effect, said second lighter isotope portion primarily exiting through said annular aperture in said end wall of said second discharge means, the discharge flow speed of the gas being increased by the rotational speed of the pipe so that all enrichment effects, which increase by a factor corresponding to the fourth power of the rotational speed, are multiplied.

4. A device for the continuous multipled enrichment of gaseous isotopes of heavy elements comprising a pipe having an end wall at one end and having an annular member at the other end, having a smooth inner surface and having an inlet and first and second discharge means, at least one nozzle being arranged adjacent said inlet and extending in a plane perpendicular to the longitudinal axis of the pipe so as to discharge tangentially relative to the internal pipe circumference, said first discharge means including an annular slot situated at the inner circumference of the pipe defined by the annular member and the inner circumference of the pipe, said second discharge means being spaced apart from said first discharge means and including an annular aperture in said end wall along the longitudinal axis of the pipe and in the proximity of said inlet and means for rotating said pipe about the longitudinal axis of the pipe in the manner of a centrifuge.

5. The device of claim 4 including an even number of nozzles being arranged at a corresponding number of inlets, each of said nozzles being arranged adjacent said inlet and extending in a plane perpendicular to the longitudinal axis of the pipe to discharge tangentially relative to the internal pipe circumference.

6. The device of claim 4 including means for adjusting said annular member of said first discharge means to control the opening of said annular slot.

7. A device for the continuous multiplied enrichment of gaseous isotopes of heavy elements comprising a pipe having first and second end walls and a smooth inner surface and having an inlet and first and second discharge means, at least one nozzle being arranged adjacent said inlet and extending in a plane perpendicular to the longitudinal axis of the pipe so as to discharge tangentially relative to the internal pipe circumference, said first discharge means including an annular opening in said first end wall in the region of the longitudinal axis of the pipe, an annular member for defining an annular discharge path with respect to said annular opening, said second discharge means being spaced apart from said first discharge means and including an annular aperture in said second end wall along the longitudinal axis of the pipe and in the proximity of said inlet and means for rotating said pipe about the longitudinal axis of the pipe in the manner of a centrifuge.

8. The device of claim 7 including means for adjusting the annular member with respect to the annular opening of said first discharge means to control the discharge of gas through said opening.

9. A device for the continuous multiplied enrichement of gaseous isotopes of heavy elements comprising a pipe having first and second end walls and a smooth inner surface and having an inlet and first and second discharge means, at least one nozzle being arranged adjacent said inlet and extending in a plane perpendicular to the longitudinal axis of the pipe so as to discharge tangentially relative to the internal pipe circumference, said first discharge means adjacent said first end wall and including openings extending tangential to the inner pipe circumference, said second discharge means being spaced apart from said first discharge means and being in the form of an annular aperture in said second end wall adjacent the pipe axis and in the proximity of said inlet and means for rotating said pipe about the longitudinal axis of the pipe in the manner of a centrifuge.

* * * * *